MEANS AND METHOD FOR LOCATING SHRIMP AND OTHER MARINE ANIMALS

Original Filed July 31, 1969

Albert B. Silchenstedt
INVENTOR.

BY Bertram H. Mann
ATTORNEY

United States Patent Office

Re. 27,862
Reissued Jan. 1, 1974

27,862

MEANS AND METHOD FOR LOCATING SHRIMP AND OTHER MARINE ANIMALS

Albert B. Silchenstedt, Box 255, Rockport, Tex. 78382

Original No. 3,561,150, dated Feb. 9, 1971, Ser. No. 846,545, July 31, 1969, which is a continuation-in-part of abandoned Ser. No. 767,781, Oct. 15, 1968. Application for reissue July 1, 1971, Ser. No. 159,072
Int. Cl. A01k *73/02*
U.S. Cl. 43—4.5 10 Claims

Matter enclosed in heavy brackets [ ] appears in the original patent but forms no part of this reissue specification; matter printed in italics indicates the additions made by reissue.

ABSTRACT OF THE DISCLOSURE

A try net is provided with an acoustic-electrotransducer which transmits electrical oscillations to a remote filter device. The filter device is tuned to isolate the characteristic vibrations produced by selected marine animals and the signals therefrom are transmitted to an indicator.

RELATED APPLICATION

This application is a continuation-in-part of my now abandoned copending applicaton Ser. No. 767,781 filed Oct. 15, 1968.

BACKGROUND OF THE INVENTION

(I) Field of the invention

This invention relates to means and methods for locating certain types of marine animals, such as shrimp, lobsters, and the like, and consists in a novel try net apparatus equipped for sensing characteristic vibrations produced when shrimp or the like are disturbed and/or impacted.

(II) Description of the prior art

In prior art practice, shrimp trawlers customarily drag a try net in advance of the main trawl net. Periodically the try net is lifted and its contents emptied and inspected so as to determine whether or not an area populated by the desired catch has been traversed. During the period when the try net is being raised and relowered, there is no indication as to whether desirable fish have been encountered, and, furthermore, the frequent lifting and resubmerging of the try net, in addition to being time consuming, does no more than indicate that the traverse during the period since the previous inspection of the try net contents has or has not encountered the desired fish. In case shrimp are found in these contents, the captain may decide to retrace his path, even though much of the traverse may be barren of the desired fish.

SUMMARY OF THE INVENTION

An object of the present invention is to provide a device for more accurately locating the presence of shrimp and similarly acting marine animals much more accurately than is possible with the conventional try net.

Another object is to utilize the characteristic acoustic vibrations set up by the jumping or other movement of shrimp and like marine animals, upon being disturbed as by a try net moving through the water, to produce indications on the trawl vessel as to the encounter of the try net with the desired marine life.

In accordance with the present invention, a drag device, for instance, a more-or-less conventional try net, is provided with a transducer which translates a spectrum of vibrations produced in the net or in the water adjacent the net to electrical oscillations. These oscillations are then subjected to filtering for isolating the characteristic frequencies produced by the disturbed shrimp or like desirable marine animal. The tuned frequencies are then utilized for operating an indicator, such as an oscillograph or oscilloscope, to produce a continuous trace or otherwise indicate to the trawl captain that the try net is or was at a determinable time or location in an area populated by the desired marine animals. This information may be correlated with other information—for instance, depth information—so as to enable the trawl captain to greatly economize upon the amount of bottom traversed while increasing his catch. Moreover, the rear end of the try net is left open so that solid objects entering the mouth of the net may pass out through the rear thereof. Thus, the try net need not be drawn to the surface as long as fishing is continuing.

BRIEF DESCRIPTION OF THE DRAWING

In the accompanying drawing which illustrates the invention.

DESCRIPTION OF THE PREFERRED EMBODIMENT

Figure 1:
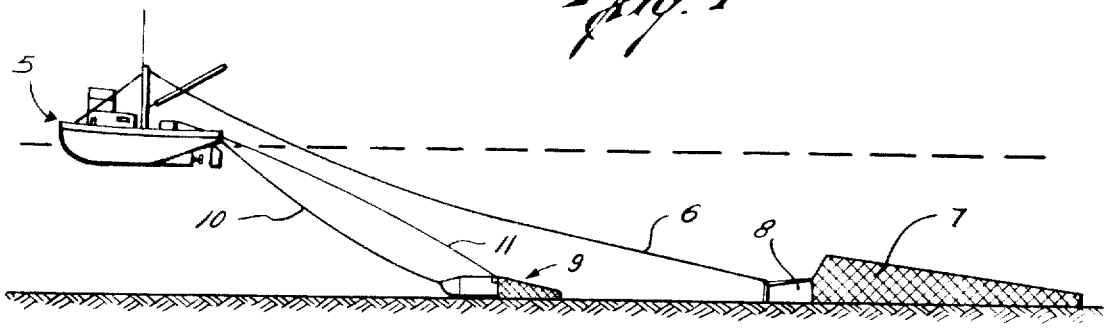
FIG. 1 is a more-or-less diagrammatic view illustrating a trawler vessel with try net and main trawl net in working positions.
Figure 2:
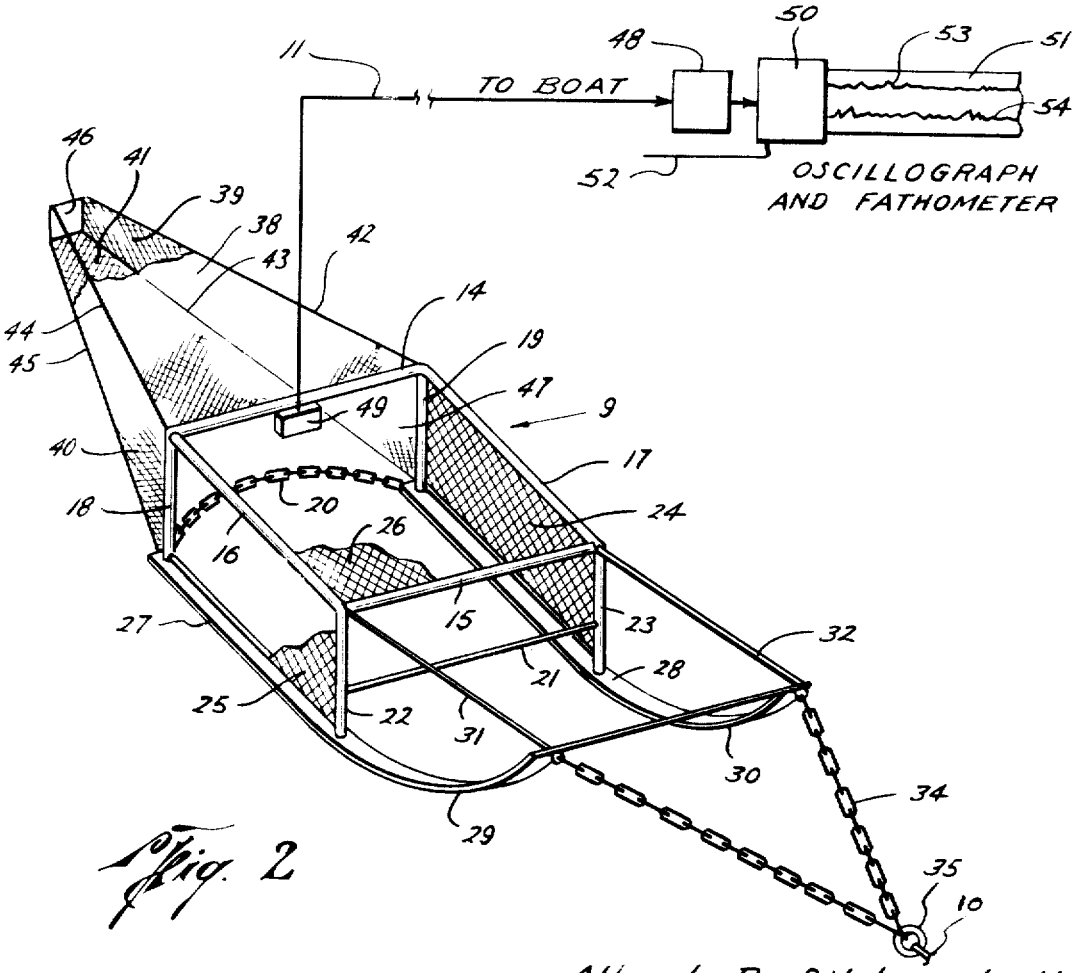
FIG. 2 is an enlarged perspective illustrating the try net, portions of the webbing being broken away and signal wiring being indicated schematically.

FIG. 1 illustrates a conventional trawl vessel 5 trailing a cable 6 and main trawl net 7 with otter doors 8 at the front end for holding the mouth of the net open. The net is made of suitable mesh material as is customary. At 9 there is shown the novel try net or locator connected to the trawl vessel by means of a draw cable or cord 10 and an electrical wire 11. Net 9, according to FIG. 2, consists of forward, generally rectangular framing including top transverse bars 14 and 15, top longitudinal bars 16 and 17, net mouth side bars 18 and 19, a foot cord or chain 20, a bottom transverse bar 21 at the front end, and forward vertical lags 22 and 23. Conventional trawler netting encloses the sides and top of the framing structure as at 24, 25, and 26. This framing rests upon runners 27 and 28 with upwardly curved forward portions 29 and 30 to which are connected longitudinal cords or bars 31 and 32 extending to the intersections of framing pieces 15, 22, and 23. A V-harness 34 extends forwardly from the intersections of runners 29 and 30 and tie bars 31 and 32 and has a ring 35 at its front end for attachment of draw cable 10.

Extending rearwardly from mouth-forming framing parts 14, 18, and 19 is a generally pyramidal trailing net having top, side, and bottom netting panels 38, 39, 40, and 41 with reinforcing corner seams 42, 43, 44, and 45. All of the above is more-or-less conventional, except for the open rear end 46 which permits ready egress of solid objects entering the mouth 47 of the net.

All of the netting panels, including those forming the pyramidal rear net, preferably, will be relatively taut as the net is drawn through the water. In order to sense sharp impacts against these panels as well as vibrations in the ambient water, a first or sending transducer 49 of any suitably sensitive and durable type is mounted at a convenient position—for instance, on top mouth-forming bar 14. This transducer is connected by electrical wiring 11 to filtering or tuning means 48, as of the capacitance-inductance type well-known to acoustics and electronic craftsmen, and a suitable indicator as second receiving transducer 50 capable of controlling the making of a record as by means of a marker and recording tape or paper 51. It will, of course, be understood that a suitable source of electrical energy and amplification will be supplied to the transducer and filtering means in accordance with well-known practices for such tuned circuits.

Also connected to indicator transducer 50 is wiring 52 extending from a coordinate instrument as a depth or fathom meter (not shown). Means for causing timed movement of tape 51 past the stylus (not shown) of transducer 50, likewise, is not illustrated, this being well-known. A pair of record traces 53 and 54 are shown.

In operation, audio frequency filter 48 initially will be tuned to emphasize the distinctive frequencies previously determined as emanating from selected marine animals when disturbed. The try or locator net 9, being nonbuoyant, will be dragged along the bottom, conveniently in advance of the main trawl net 7, as by means of the cable or cord 10 attached to the net 9 by means of equalizer harness 34. As foot cord 20 scrapes along the bottom, it will from time to time dislodge objects or bodies which will ride or jump upwardly or laterally. Shrimp and certain other marine animals so disturbed will produce the mentioned characteristic acoustic-type vibrations in the water and/or in one of the netting panels. Since all of these panels will be held taut at least during transport of the device through the water, striking thereof will set up various reactions therein. I have found that shrimp, lobsters, or certain other marine animals when disturbed as by food cord 20 and/or when striking another part of the net will create distinctive vibrations by quickly jumping away. On the other hand, other kinds of fish and inanimate objects will respond differently, for instance, may tend to adhere to the netting for at least a longer period, so that any vibrations created by them will be of substantially different frequency. The effect of such shrimp-produced impulses is so distinctive and pronounced as to be sensed by a practiced operator merely holding a light cord which is connected to a vibratory device in suitable shallow water. In deeper waters, such manual sensing is not practical and, therefore, electrical or electronic transmission of vibrations is relied upon. As stated, filter or tuner 48 initially will be adjusted to relatively accentuate the mentioned distinctive frequencies resulting from engagement with bodies being sought, while attenuating other (noise or fortuitous) vibrations.

Where receiving transducer 50 actuates a marker, a visible trace as 53 will be applied to the traveling tape 51, which will be an analog of tuned frequencies transmitted upon excitation of sending transducer 49. A correlated record 54 may be traced on the same tape. Thus, these record traces can be viewed from time to time and need not be constantly observed.

Other forms of skeletonized devices may be utilized for dragging through the water, with or without netting—for instance, cords traversing a frame, as at 14, 18, and 19. Furthermore, different indicating means may be provided, either visual or sonic and permanent, as in the case of the traces shown, or temporary, as in the case of an oscilloscope.

I claim:

1. A locator for shrimp and like marine animals comprising a structure to be dragged through the water, an acoustic-electrotransducer carried by said structure, an audio frequency filter device electrically connected to said transducer, said filter device being tuned for accentuating distinctive acoustic vibrations determined to be originated by selected marine animals when disturbed, and indicator means associated with said filter device for registering said accentuated vibrations.

2. A locator as described in claim 1 in which said structure comprises a try net and is open at the mouth and rear ends.

3. A locator as described in claim 2 in which said net is constructed to be taut during operation in the water so as to vibrate when struck by submerged objects, said transducer being positioned to sense said net vibrations.

4. A locator as described in claim 1 in which said indicator means and filter device are carried on a trawl vessel for convenient reference by operating personnel.

5. The method of locating shrimp and like marine animals in a body of water comprising the steps of determining by means of an electrical oscillation tuning apparatus the distinctive frequencies emanating from such marine animals when disturbed, dragging a skeletonized structure including a transducer through the water, sensing by means of said transducer acoustic vibrations in the ambient water produced when shrimp or the like are disturbed by the structure and translating said vibrations to electrical oscillations, transmitting said oscillations to an operating station filtering said oscillations to accentuate said distinctive frequencies, and creating indications of the accentuated oscillations.

*6. A locator for shrimp and like marine animals comprising a structure to be dragged through the water, vibratory energy sensing means carried by said structure, a filter device electrically connected to said sensing means, said filter device being tuned for accentuating distinctive vibrations determined to emanate from selected marine animals when disturbed, and indicator means associated with said filter device for registering said accentuated vibrations.*

*7. The method of locating shrimp and like marine animals in a body of water comprising the steps of determining by means of an electrical oscillation tuning apparatus the distinctive frequencies resultant from the disturbance of such marine animals, dragging a structure including a transducer through the water, sensing by means of said transducer oscillations in the ambient water resultant when shrimp or the like are disturbed by the structure, translating said oscillations to electrical waves, filtering said oscillations to accentuate said distinctive frequencies, and creating indications of the accentuated oscillations.*

*8. A device for detecting selected underwater bodies comprising a structure to be dragged through the water, acoustic-electro transducer means carried by such structure, filter means electrically connected to said transducer means and tuned for accentuating distinctive signals determined to be originated by encounter between such bodies and said structure, and indicator means associated with said filter means for registering said accentuated signals.*

*9. The method of detecting selected marine bodies in a body of water comprising the steps of determining the distinctive signals produced when such bodies are encountered by a structure passing through the water, passing a structure including transducer means through the water, sensing by means of said transducer means, acoustic signals produced upon encounters between such bodies and the structure, transmitting said signals to an operating station, and creating intelligible indications of said transmitted signals.*

*10. The method described in claim 9 including filtering said vibrations to accentuate distinctive signals sought.*

References Cited

The following references, cited by the Examiner, are of record in the patented file of this patent or the original patent.

UNITED STATES PATENTS

| | | | |
|---|---|---|---|
| 3,123,798 | 3/1964 | Holloway et al. | 43—17.1 |
| 2,765,565 | 10/1956 | Mussio | 43—9 |
| 3,382,598 | 5/1968 | Wilson | 43—17 |
| 3,478,462 | 11/1969 | Herbst et al. | 43—9 |

FOREIGN PATENTS 895,814 5/1962 Great Britain.

WARNER H. CAMP, Primary Examiner

U.S. Cl. X.R.

43—8, 17